(12) United States Patent
Bellamkonda

(10) Patent No.: US 11,036,734 B2
(45) Date of Patent: Jun. 15, 2021

(54) FUSING GLOBAL REPORTING AGGREGATE COMPUTATION WITH THE UNDERLYING OPERATION IN THE QUERY TREE FOR EFFICIENT EVALUATION

(71) Applicant: Oracle International Corporation, Redwood Shores, CA (US)

(72) Inventor: Srikanth Bellamkonda, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1135 days.

(21) Appl. No.: 15/063,828

(22) Filed: Mar. 8, 2016

(65) Prior Publication Data
US 2017/0262503 A1  Sep. 14, 2017

(51) Int. Cl.
G06F 16/2453 (2019.01)
G06F 16/22 (2019.01)
G06F 16/2455 (2019.01)
G06F 16/242 (2019.01)

(52) U.S. Cl.
CPC .... G06F 16/24542 (2019.01); G06F 16/2246 (2019.01); G06F 16/2255 (2019.01); G06F 16/244 (2019.01); G06F 16/24556 (2019.01); G06F 16/24561 (2019.01)

(58) Field of Classification Search
CPC ......... G06F 16/24556; G06F 16/24542; G06F 16/2246; G06F 16/2255
See application file for complete search history.

(56) References Cited

U.S. PATENT DOCUMENTS

| 5,884,299 | A | 3/1999 | Ramesh et al. |
| 6,487,546 | B1 | 11/2002 | Witkowski |
| 9,158,812 | B2 | 10/2015 | Li et al. |
| 9,390,129 | B2 | 7/2016 | Li et al. |
| 9,460,154 | B2 | 10/2016 | Bellamkonda et al. |
| 2009/0037367 | A1* | 2/2009 | Wein ............... G06F 9/5061 |
| 2014/0156636 | A1* | 6/2014 | Bellamkonda .... G06F 16/24556 707/718 |
| 2014/0280030 | A1* | 9/2014 | Freedman ........ G06F 16/24542 707/718 |
| 2015/0379077 | A1* | 12/2015 | Grosse ............. G06F 16/24532 707/718 |

* cited by examiner

Primary Examiner — Amresh Singh
(74) Attorney, Agent, or Firm — Hickman Becker Bingham Ledesma LLP

(57) ABSTRACT

Techniques herein generate a query plan that combines a global reporting aggregate calculation and an organizing operation. A method detects an organizing operation, a group aggregate function, and a global aggregate function within a database statement. The organizing operation specifies organizational activities such as grouping, joining, or sorting rows. The method generates an execution plan that specifies calculating all values in a single pass. For each row, the single pass applies the organizing operation and updates an access structure. The pass updates one of multiple cumulative group calculations based on the group aggregate function and updates a cumulative global calculation based on the global aggregate function. Each cumulative group calculation is associated with some of the access structure. Based on the access structure, result rows that satisfy the database statement are generated. Result rows contain a final result of each group calculation and a final result of the global calculation.

23 Claims, 18 Drawing Sheets

FIG. 1A

DATABASE STATEMENT 101

SELECT color,
　　　$\boxed{\text{SUM(weight) OVER ( )}}$ GLOBAL AGGREGATE FUNCTION 111

FROM (SELECT color, weight FROM Record )

FIG. 4A

DATABASE STATEMENT 401

SELECT color,
       SUM(weight) OVER ()    GLOBAL AGGREGATE FUNCTION 411
FROM (SELECT
       DISTINCT color, weight    ORGANIZING OPERATION 421
      FROM Record )

FIG. 4B

DATABASE STATEMENT 402

SELECT color,
SUM(weight) OVER () [GLOBAL AGGREGATE FUNCTION 412]
FROM (SELECT color, weight FROM Record
ORDER BY color, weight [ORGANIZING OPERATION 422]
LIMIT 100000
)

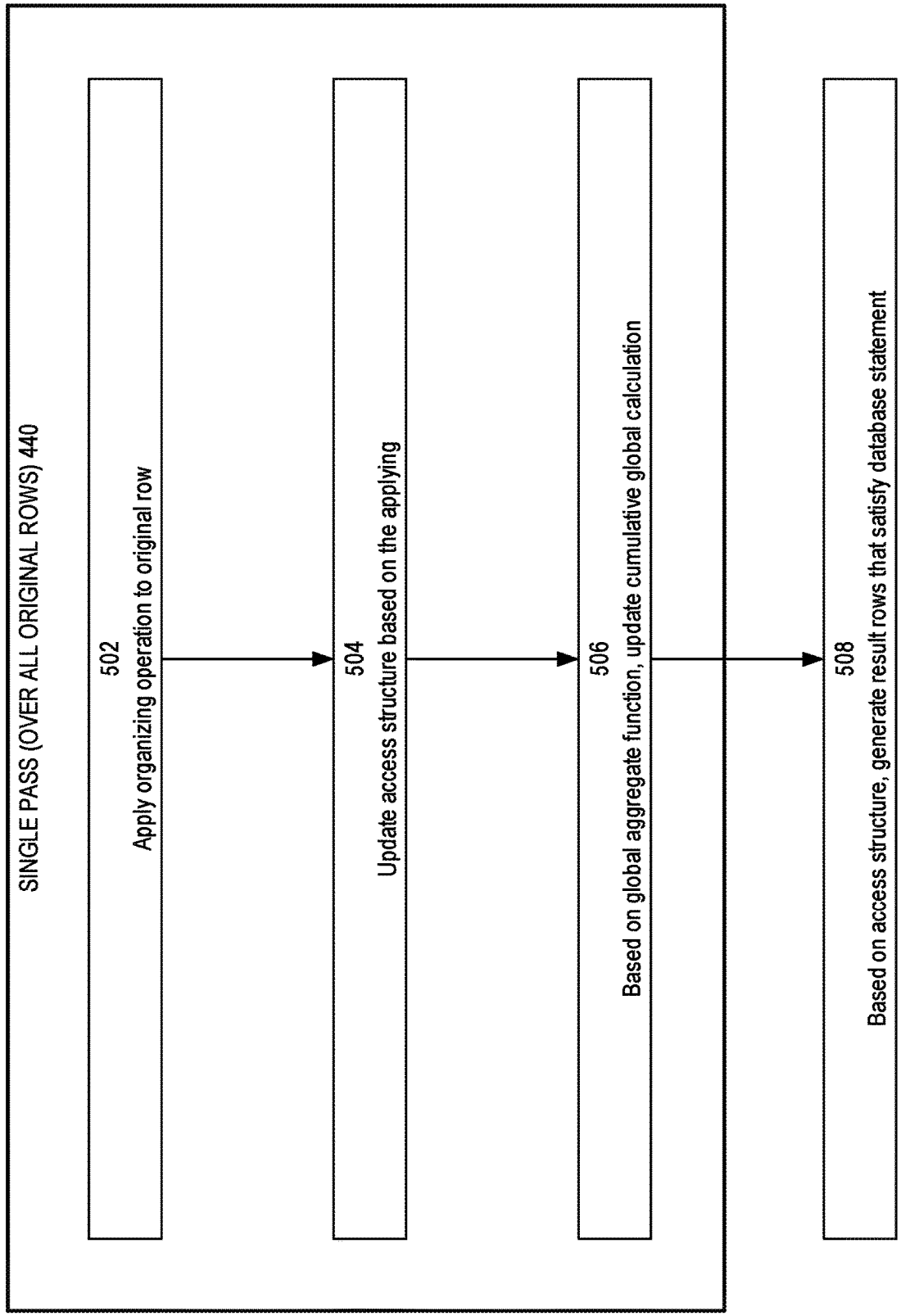

FIG. 6

DATABASE STATEMENT 601

SELECT color, subtotal,
SUM(subtotal) OVER ()  — GLOBAL AGGREGATE FUNCTION 611
FROM (SELECT color,
SUM(weight)  — GROUP AGGREGATE FUNCTION 631
AS subtotal
FROM Record
GROUP BY color  — ORGANIZING OPERATION 621
)

FIG. 12

OPTIMIZATION CHART 1200

| EXAMPLE | GROUP AGGREGATE FUNCTION | GIVEN GLOBAL AGGREGATE FUNCTION | OPTIMIZED GLOBAL AGGREGATE FUNCTION |
|---|---|---|---|
| A | COUNT(*) | SUM | COUNT(*) |
| B | COUNT(C) | SUM | COUNT(C) |
| C | SUM | SUM | SUM |
| D | MAX | MAX | MAX |
| E | MIN | MIN | MIN |
| F | SUM | MAX | |
| G | MAX | SUM | |

FUSING GLOBAL REPORTING AGGREGATE COMPUTATION WITH THE UNDERLYING OPERATION IN THE QUERY TREE FOR EFFICIENT EVALUATION

FIELD OF THE DISCLOSURE

This disclosure relates to query planning and execution. Techniques are presented for generating and executing an optimal query plan that computes a global reporting aggregate in a single pass over tabular data.

BACKGROUND

Analytics and reporting are activities that involve generating summary data from database tables of many rows. In database systems, an aggregate function is a mathematical, statistical, or other function that derives a single value from the values in at least one column for multiple rows. Aggregate functions can be used to find extrema, grand totals, and subtotals. Aggregate functions are part of the structured query language (SQL) standard and are important for summarizing data. As such, aggregate functions are an important part of reporting and analytics for big data and data warehouses, as well as data science.

Data summarization typically occurs in two phases. During a first phase, rows are grouped and/or sorted, and duplicates may be suppressed. During a second pass and based on the results of the first pass, global reporting aggregates such as grand totals are calculated. Calculation of a global reporting aggregate may involve applying an aggregate mathematical function to many rows to compute a value such as a minimum, a maximum, an average, a count, or a sum.

An query plan or execution plan refers to a set of steps that are generated by a database system to execute a database statement such as a query, etc. Several candidate execution plans may be generated for a particular statement, and a candidate execution plan estimated to be most efficient may be selected as the actual execution plan. The selection of an optimal candidate execution plan is beyond the scope of the present application and the selection of an efficient candidate execution plan will be assumed.

An execution plan may be represented by a tree or a graph of interlinked nodes, such as operators or operations, each of which corresponds to a step of an execution plan, referred to herein as an execution plan operation. The hierarchy of the tree represents the order in which the execution plan operations are performed and how data flows between each of the execution plan operations. Execution plan operations include, for example, an aggregation, a sort, a table scan, an index scan, hash-join, sort-merge join, nested-loop join, and filter.

A database system may generate a query plan that specifies a sequence of operations to perform while executing a particular query. Organizing operations, such as grouping or sorting, and global reporting aggregates typically are not performed in a same pass over data rows. If a query specifies a global reporting aggregate and an organizing operation, then a database system typically generates a query plan that requires two passes. Execution of such a query plan performs grouping, sorting, and duplicate suppression during the first pass and calculation of global reporting aggregates during the second pass.

Execution in two passes may present performance issues, including excessive access of storage. For example, if results are too large to fit entirely within memory, then the results must be spilled to disk when computed by the first pass. However, these results may also be needed by the second pass, which may require that the results be retrieved from disk during the second pass. Spilling data to disk followed by retrieval of the same data from disk may cause thrashing of durable storage and associated memory cache. This may increase consumption of time and electricity.

BRIEF DESCRIPTION OF THE DRAWINGS

In the drawings:

FIG. 1A is a block diagram that depicts an example database statement, in an embodiment;

FIG. 4A is a block diagram that depicts an example database statement, in an embodiment;

FIG. 4B is a block diagram that depicts an example database statement, in an embodiment;

FIG. 5 is a flow diagram that depicts an example process that executes a query plan, in an embodiment;

FIG. 6 is a block diagram that depicts an example database statement, in an embodiment;

FIG. 12 depicts an example optimization chart, in an embodiment;

DETAILED DESCRIPTION

Figure 1B:
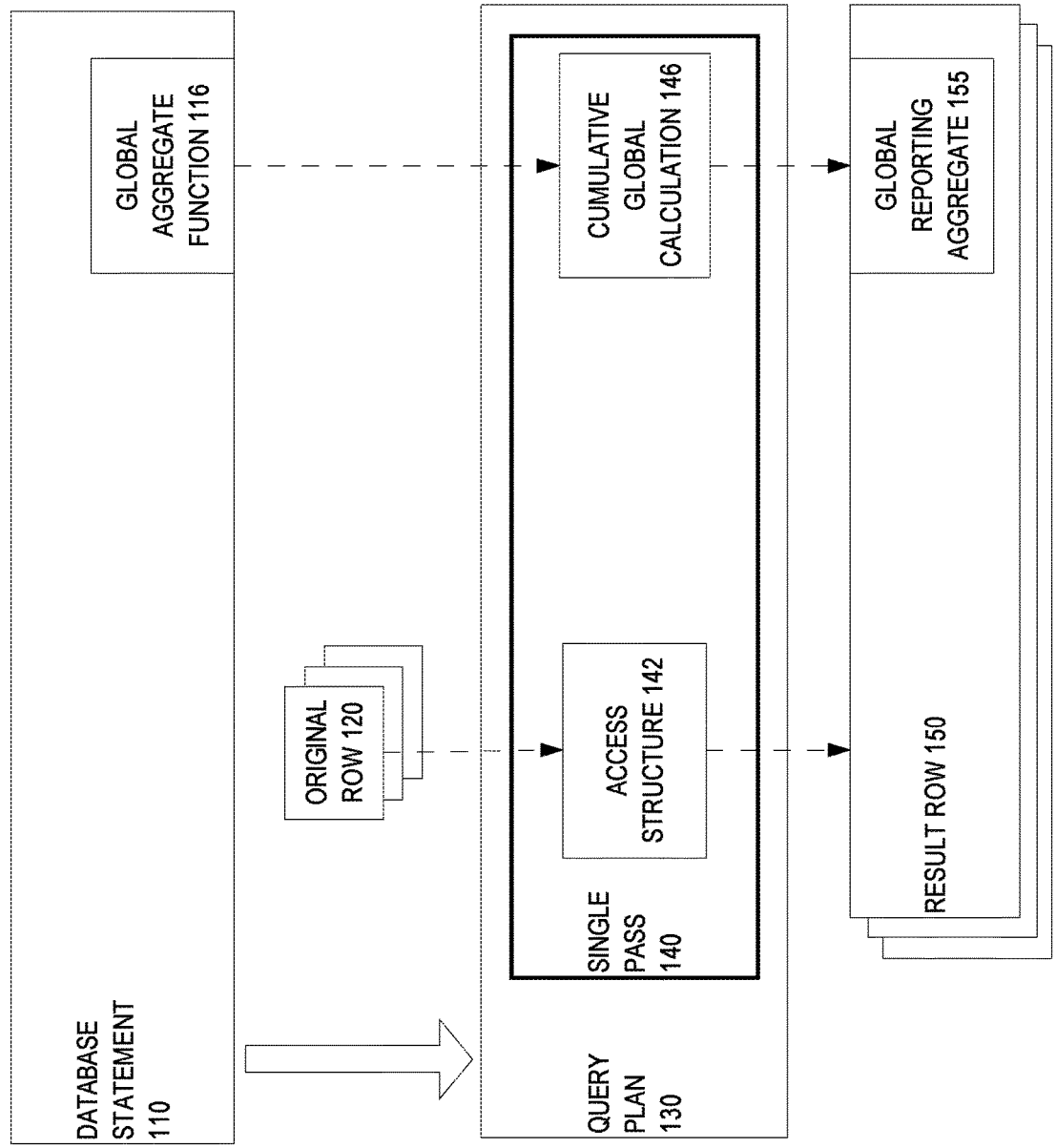
FIG. 1B is a block diagram that depicts an example database system, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. First Example Database Statement
3.0. First Example Database System
4.0 Example Process
5.0 First Example Query Plan
6.0. Second Example Database Statement 7.0. Third Example Database Statement
8.0. Second Example Database System
9.0 Second Example Query Plan
10.0. Fourth Example Database Statement
11.0. Third Example Database System
12.0 Third Example Query Plan
13.0 Example Hash Table
14.0 Example B-Tree
15.0 Example Parallelism
16.0 Example Optimizations
   16.1 Replacement Of Global Aggregate Function
   16.2 Other Optimization With Idempotency
   16.3 Compensation Without Idempotency
17.0 Discrepant Aggregate Functions
18.0 Costing
19.0 Hardware Overview 1.0 General Overview Computerized techniques are provided for generating a query plan that fuses a global reporting aggregate computation with an organizing operation in a query tree for efficient evaluation.

In an embodiment, a computer detects an organizing operation and a global aggregate function that are specified in a database statement issued against rows of tabular data. Depending on the embodiment, a computer may also detect a group aggregate function that is specified in a database statement.

The organizing operation may specify activities that organize data such as aggregating groups of rows, joining rows, filtering unique rows, or sorting rows. Based on detecting needed components within the database statement, the computer generates an execution plan for the database statement. The execution plan specifies calculating all output values in a single pass over the rows of data.

For each row of data, the single pass is configured to apply the organizing operation to the row and update an access structure based on the result of the organizing operation. Also for each row of data, the single pass is configured to update a cumulative global calculation based on the global aggregate function.

Depending on the embodiment, for each row of data, the single pass may also be configured to update one of multiple cumulative group calculations based on the group aggregate function. Each cumulative group calculation is associated with a respective portion of the access structure. For example if the access structure is a hash table, then the respective portion is a bucket of the hash table.

Based on the access structure, the computer generates result rows that satisfy the database statement. Depending on the embodiment, a final result of each cumulative group calculation may be contained in at least one of the result rows. Each of the result rows contains a final result of the cumulative global calculation, also known as a global reporting aggregate.

In an embodiment, the access structure is a hash table. In another embodiment, the access structure is a B-Tree.

2.0 First Example Database Statement

FIG. 1A is a block diagram that depicts an example database statement 101, in an embodiment. Database statement 101 is an example of a query that requests a global reporting aggregate, which may be a grand total, with result rows organized, in this example by suppressing duplicates. As such, database statement 101 conforms to a pattern for which a query plan may be devised that fuses a global reporting aggregate computation with an organizing operation for efficient evaluation in a single pass.

Database statement 101 may be expressed according to a formal query language such as structured query language (SQL). Database statement 101 may specify tables to access, columns to project, rows to filter, and operators to apply.

As an example, database statement 101 may comprise the following query that calculates a grand total weight, according to global aggregate function 111 and regardless of color, and reports that same grand total in every result row:

SELECT color, SUM(weight) OVER ( ) FROM (SELECT color, weight FROM Record);

Database statement 101 contains components that are important to query planning for optimized global aggregate reporting. Within database statement 101 is global aggregate function 111.

Global aggregate function 111 may be any statistical, mathematical, or other operation that takes multiple rows as input and yields a single value as an output. For example, global aggregate function 111 may specify a calculation of a minimum, a maximum, an average, a count, a sum, a median, a mode, a variance, or a standard deviation.

Given the presence of global aggregate function 111 within database statement 101, an innovative database system may generate a query plan that can execute database statement 101 during a single pass over the data. However, a special configuration is needed to achieve this optimization and is discussed later herein.

3.0 First Example Database System

FIG. 1B is a block diagram that depicts an example database system 100, in an embodiment. Database system 100 fuses a global reporting aggregate computation with an organizing operation in a query tree for efficient evaluation. Database system 100 may be a relational database system that manages tables, schemas, indices, and other relational or tabular artifacts.

Database system 100 may be hosted on one or more computers, such as rack servers, with each having an operating system, network interface, and durable storage such as mechanical drives and flash drives. Database system 100 also includes database statement 110, original rows 120, query plan 130, and result rows 150.

In operation, database system 100 receives database statement 110. Database statement 110 may have an implementation such as database statement 101 of FIG. 1A, and both of these statements conform to the same constraints described above.

Database system 100 compiles and optimizes database statement 110 to generate query plan 130. Query plan 130 specifies that database system 100 should perform database statement 110 during a single pass 140.

Single pass 140 iterates over original rows 120. Original rows 120 are tabular records with column values. To access original rows 120, database statement 110 may specify one or more tables to read directly, may specify a subquery to execute that produces rows, or may specify any other means of producing rows for subsequent analysis.

During single pass 140, the processing of original rows 120 involves constructing and populating access structure 142 to assemble intermediate results. Access structure 142 may be a hash table, B-tree, or other data structure for assembling data.

Initially, access structure 142 is empty. During iteration over original rows 120, database system 100 visits each original row 120, perhaps during a table scan. For each original row 120, database system 100 decides whether or not original row 120 is filtered away.

If original row 120 is not skipped during filtration, then database system 100 traverses access structure 142 to locate a proper position in which to insert data that is derived from original row 120 and will represent a corresponding result row 150.

Populating access structure 142 with data is not the only computation that occurs during single pass 142. Also during single pass 142, cumulative global calculation 146 is an ongoing computation that is potentially updated each time database system 100 visits another original row 120.

Updating cumulative global calculation 146 depends on the global aggregate function 116. In this example, the global aggregate function 116 specifies arithmetic summation.

Global aggregate function 116 is applied during single pass 140. Performance of single pass 140 finishes when all original rows 120 have been processed. After single pass 140, some processing is still pending. This includes copying the final value of cumulative global calculation 146, shown as global reporting aggregate 155, into result rows 150. This also includes final formatting of result rows 150 and their serialization to a consumer.

4.0 Example Process

Figure 2:
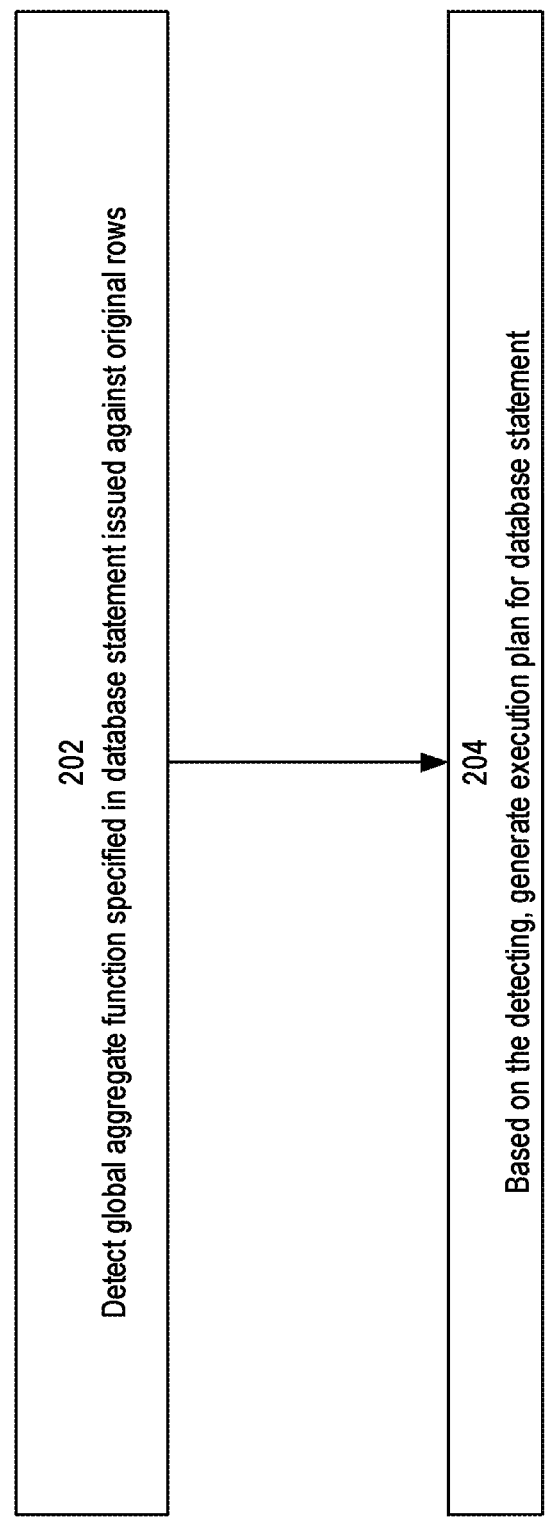
FIG. 2 is a flow diagram that depicts an example process for generating a query plan, in an embodiment.

FIG. 2 is a flow chart that depicts an example process for generating a query plan that has a single pass, in an embodiment. The steps of this process are discussed with respect to database system 100.

In step 202 a database system receives and parses a database statement. For example, database system 100 receives database statement 110 and parses it into constituent clauses and terms. Database statement 110 may be delivered over a network connection such as by open database connectivity (ODBC), over an inter-process socket or queue, or within an SQL script file.

Database system 100 recognizes that global aggregate function 116 is present within database statement 110 as required for aggregate reporting in a single pass.

Figure 3:
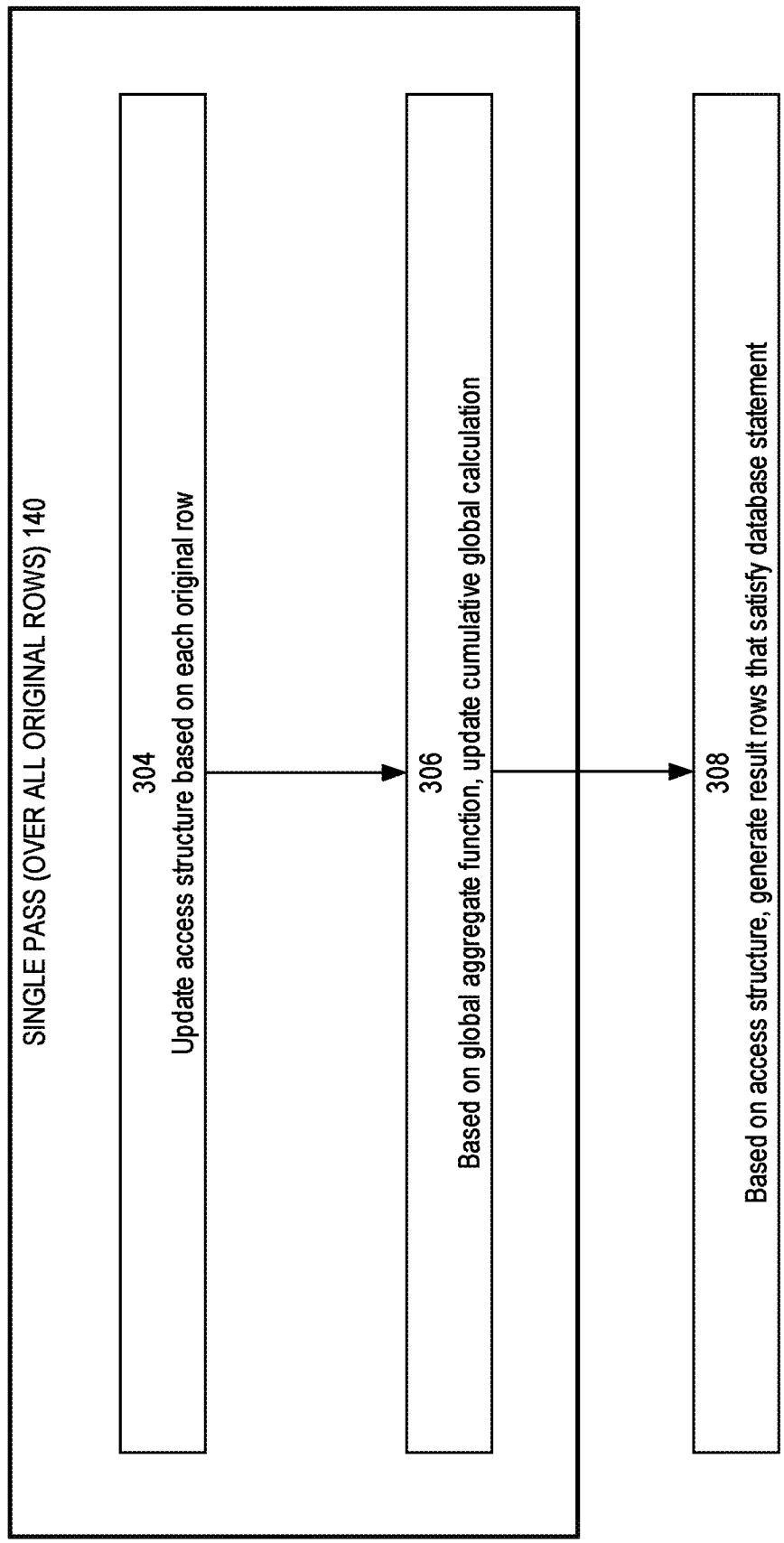
FIG. 3 is a flow diagram that depicts an example process that executes a query plan, in an embodiment.

In step 204 the database system generates an optimized query plan that needs only one pass. For example, database system 100 generates query plan 130 that can satisfy database statement 110 during single pass 140. The details of query plan 130 are shown in FIG. 3. The optimizations described herein for single pass 140 may be supplemented with additional optimizations that are typical of database systems.

5.0 First Example Query Plan

FIG. 3 is a flow chart that depicts query plan 130 as an example query plan that calculates a global reporting aggregate in a single pass, in an embodiment. The steps of this process are discussed with respect to database system 100.

The heart of query plan 130 is single pass 140, which specifies all of the processing needed to calculate a global reporting aggregate. After single pass 140, step 308 generates result rows, for which all values were calculated during single pass 140. Calculating all values during single pass 140 may decrease consumption of time and electricity, as compared to performing two passes over data in a conventional query plan.

Single pass 140 has steps 304 and 306. Query plan 130 specifies that the steps of single pass 140 are to be repeated for each of original rows 120. During single pass 140, but before step 304, database system 100 constructs access structure 142, which is initially empty.

Step 304 populates the access structure. For example, database system 100 determines a proper insertion location within access structure 142 for the current original row 120.

If no prior data is found within access structure 142 at the proper location, then database system 100 adds data from original row 120 to access structure 142 at that location.

Otherwise existing data is found, and database system 100 merely adjusts that data based on the current original row 120. For example when existing data is found, database system 100 may increment a counter or other cumulative calculation.

Step 306 updates a cumulative global calculation, such as a grand total. For example, database system 100 updates cumulative global calculation 146 based on global aggregate function 116 and the current original row 120. Depending on the type of global aggregate function 116, in some cases cumulative global calculation 146 will not be updated for every original row 120. For example, if global aggregate function 116 specifies a numeric maximum, then cumulative global calculation 146 will be updated only if a prior maximum is exceeded by the value of the current original row 120.

Step 308 generates result rows. For example before this step begins, single pass 140 has finished, and all original rows 120 were processed. All of the values needed for result rows 150 were determined during single pass 140. Each result row 150 has values supplied by corresponding data within access structure 142. Database system 100 copies global reporting aggregate 155 into at least one result row 150. Step 308 also performs final formatting of result rows 150 and serializes them to a consumer.

6.0 Second Example Database Statement

FIG. 4A is a block diagram that depicts an example database statement 401, in an embodiment. Database statement 401 is an example of a query that requests a global reporting aggregate, which may be a grand total, with result rows organized, in this example by suppressing duplicates. As such, database statement 401 conforms to a pattern for which a query plan may be devised that fuses a global reporting aggregate computation with an organizing operation for efficient evaluation in a single pass.

As an example, database statement 411 may comprise the following query that calculates a grand total weight, according to global aggregate function 411 and regardless of color, and reports that same grand total for each unique combination of color and weight, per organizing operation 421:

SELECT color, SUM(weight) OVER ( ) FROM (SELECT DISTINCT color, weight FROM Record);

Database statement 401 contains components that are important to query planning for optimized global aggregate reporting. Within database statement 401 are global aggregate function 411 and organizing operation 421.

Global aggregate function 411 may be any statistical, mathematical, or other operation that takes multiple rows as input and yields a single value as an output. For example, global aggregate function 411 may specify a calculation of a minimum, a maximum, an average, a count, a sum, a median, a mode, a variance, or a standard deviation.

Organizing operation 421 may specify grouping, such as with a GROUP BY clause in SQL. Organizing operation 421 may specify sorting, such as with an ORDER BY clause in SQL. Organizing operation 421 may specify suppression of duplicate rows, such as with the DISTINCT keyword in SQL. In an embodiment and depending on the details of database statement 401, there may be moving window computations within or in addition to global aggregate function 411.

Given the presence of global aggregate function 411 and organizing operation 421 within database statement 401, an innovative database system may generate a query plan that can execute database statement 401 during a single pass over the data. However, a special configuration is needed to achieve this optimization and is discussed later herein.

7.0 Third Example Database Statement

As another example, FIG. 4B is a block diagram that depicts an example database statement 402, in an embodiment. For example, database statement 402 may comprise the following query that sorts according to organizing operation 422 and then calculates a grand total weight according to global aggregate function 412 for a limited subset:

```
SELECT color, subtotal,
    SUM(weight) OVER ( )
FROM (SELECT color, weight
    FROM Record
    ORDER BY color, weight
    LIMIT 100000 )
```

8.0 Second Example Database System

Figure 4C:
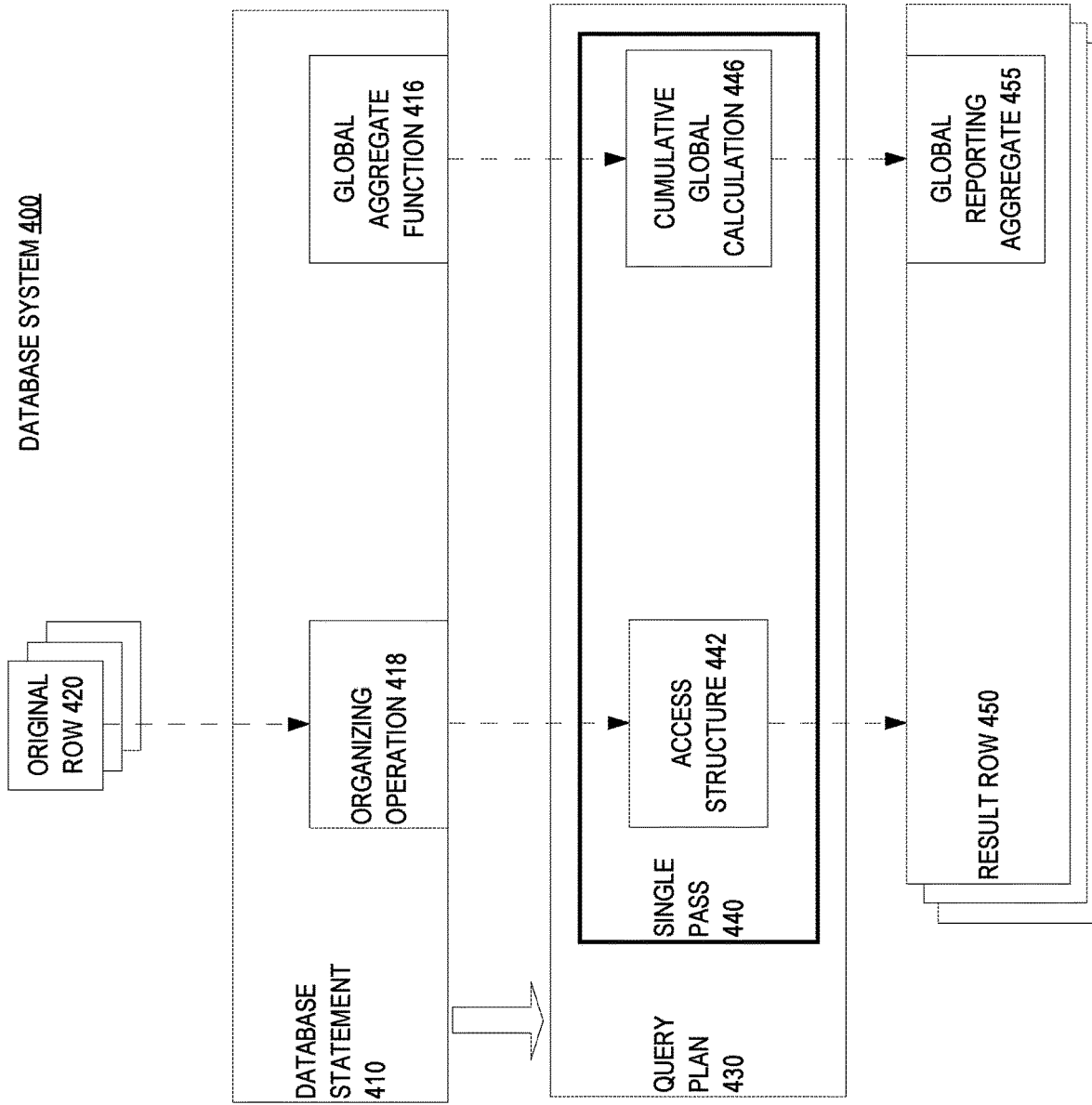
FIG. 4C is a block diagram that depicts an example database system, in an embodiment.

FIG. 4C is a block diagram that depicts an example database system 400, in an embodiment. Database system 400 fuses a global reporting aggregate computation with an organizing operation in a query tree for efficient evaluation.

Database system 400 may be an implementation of database system 100. Database system 400 also includes database statement 410, original rows 420, query plan 430, and result rows 450.

In operation, database system 400 receives database statement 410. Database statement 410 may have an implementation such as database statement 411 of FIG. 4A, and both of these statements conform to the same constraints described above. As such, database statement 410 has global aggregate function 416 and organizing operation 418.

Database system 400 compiles and optimizes database statement 410 to generate query plan 430. Query plan 430 specifies that database system 400 should perform database statement 410 during a single pass 440.

Single pass 440 processes organizing operation 418 to iterate over original rows 420. Original rows 420 are tabular records with column values. To access original rows 420, organizing operation 418 may specify one or more tables to read directly, may specify a subquery to execute that produces rows, or may specify any other means of producing rows for subsequent analysis.

During single pass 440, the processing of organizing operation 418 involves constructing and populating access structure 442 to organize intermediate results according to grouping, sorting, or uniqueness as specified by database statement 410. Access structure 442 may be a hash table, B-tree, or other data structure for organizing data.

A hash table or a B-tree is well suited for grouping, such as per a GROUP BY clause, and for duplicate suppression, such as per the DISTINCT keyword. A B-tree is also well suited for sorting, such as per an ORDER BY clause. Specific applications of hash tables and B-trees are discussed later herein.

If organizing operation 418 specifies a join of two tables, then access structure 442 may be a hash table. In such a case, database system 400 may calculate a hash code for each original row 420 from each of the two tables being joined. Two rows likely join together when their hash codes match.

Initially, access structure 442 is empty. During iteration over original rows 420, organizing operation 418 visits each original row 420, perhaps during a table scan. For each original row 420, organizing operation 418 decides whether or not original row 420 is filtered away.

If original row 420 is not skipped during filtration, then organizing operation 418 traverses access structure 442 to locate a proper position in which to insert data that is derived from original row 420 and will represent a corresponding result row 450. If organizing operation 418 specifies sorting, then locating an insertion position within access structure 442 may involve repeated comparisons of data to find a properly collated position for insertion.

By locating an insertion position, single pass 440 may detect that identical data has already been inserted into access structure 442 and, if organizing operation 418 specifies duplicate suppression, the current original row 420 need not be inserted.

If organizing operation 418 specifies grouping, then single pass 440 decides in which group does the current original row 420 belong. If single pass 440 detects that data has already been inserted into access structure 442 for that group, then the current original row 420 need not be inserted.

Populating access structure 442 with data is not the only computation that occurs during single pass 442. Also during single pass 442, cumulative global calculation 446 is an ongoing computation that is potentially updated each time organizing operation 418 visits another original row 420.

Updating cumulative global calculation 446 depends on the global aggregate function 416. In this example, the global aggregate function 416 specifies arithmetic summation.

Global aggregate function 416 is applied during single pass 440. Performance of single pass 440 finishes when all original rows 420 have been processed. After single pass 440, some processing is still pending. This includes copying the final value of cumulative global calculation 446, shown as global reporting aggregate 455, into result rows 450. This also includes final formatting of result rows 450 and their serialization to a consumer.

9.0 Second Example Query Plan

FIG. 5 is a flow chart that depicts query plan 430 as an example query plan that calculates a global reporting aggregate in a single pass, in an embodiment. The steps of this process are discussed with respect to database system 400.

The heart of query plan 430 is single pass 440, which specifies all of the processing needed to calculate a global reporting aggregate. After single pass 440, step 508 generates result rows, for which all values were calculated during single pass 440. Calculating all values during single pass 440 may decrease consumption of time and electricity, as compared to performing two passes over data in a conventional query plan.

Single pass 440 has steps 502, 504, and 506. Query plan 430 specifies that the steps of single pass 440 are to be repeated for each of original rows 420. During single pass 440, but before step 502, database system 400 constructs access structure 442, which is initially empty.

Step 502 applies an organizing operation to the current original row. For example, database system 400 applies organizing operation 418 to the current original row 420. Applying organizing operation 418 may involve computing a hash code that can identify original row 420 based on some of the values within original row 420.

Original rows 420 may be available in columnar format, such that all values for one column across all rows may be contiguously arranged. This may accelerate step 502, if organizing operation 418 depends on the column that is available in columnar format.

Step 504 populates the access structure. Depending on the implementation, steps 502 and 504 may be combined. For example, database system 400 determines a proper insertion location within access structure 442 for the current original row 420, based on organizing operation 418.

If no prior data is found within access structure 442 at the proper location, then database system 400 adds data from original row 420 to access structure 442 at that location. Otherwise existing data is found, and database system 400 merely adjusts that data based on the current original row 420. For example when existing data is found, database system 400 may increment a counter or other cumulative calculation.

If organizing operation 418 specifies data organization such as sorting, grouping, or uniqueness, then that data organization is accomplished by the use of access structure 442. If access structure 442 is a hash table, then the hash code computed in step 502 determines in which bucket to put data from original row 420. If access structure 442 is a B-tree, then repeated value comparisons are made while traversing intermediate tree nodes.

Step 506 updates a cumulative global calculation, such as a grand total. For example, database system 400 updates cumulative global calculation 446 based on global aggregate function 416 and the current original row 420. Depending on the type of global aggregate function 416, in some cases cumulative global calculation 446 will not be updated for every original row 420. For example, if global aggregate function 416 specifies a numeric maximum, then cumulative global calculation 446 will be updated only if a prior maximum is exceeded by the value of the current original row 420.

Step 508 generates result rows. For example before this step begins, single pass 440 has finished, and all original rows 420 were processed. All of the values needed for result rows 450 were determined during single pass 440. Each result row 450 has values supplied by corresponding data within access structure 442. Database system 400 copies global reporting aggregate 455 into at least one result row 450. Step 508 also performs final formatting of result rows 450 and serializes them to a consumer.

10.0 Fourth Example Database Statement

As another example, FIG. 6 is a block diagram that depicts an example database statement 601, in an embodiment. Database statement 601 includes organizing operation 621, global aggregate function 611, and group aggregate function 631. For example, database statement 601 may comprise the following query that calculates a grand total weight per global aggregate function 611 as well as weight subtotals per group aggregate function 631 by color per organizing operation 621:

```
SELECT color, subtotal,
       SUM(subtotal) OVER ( )
FROM (SELECT color,
       SUM(weight)
       AS subtotal
     FROM Record
     GROUP BY color )
```

11.0 Third Example Database System

Figure 7:
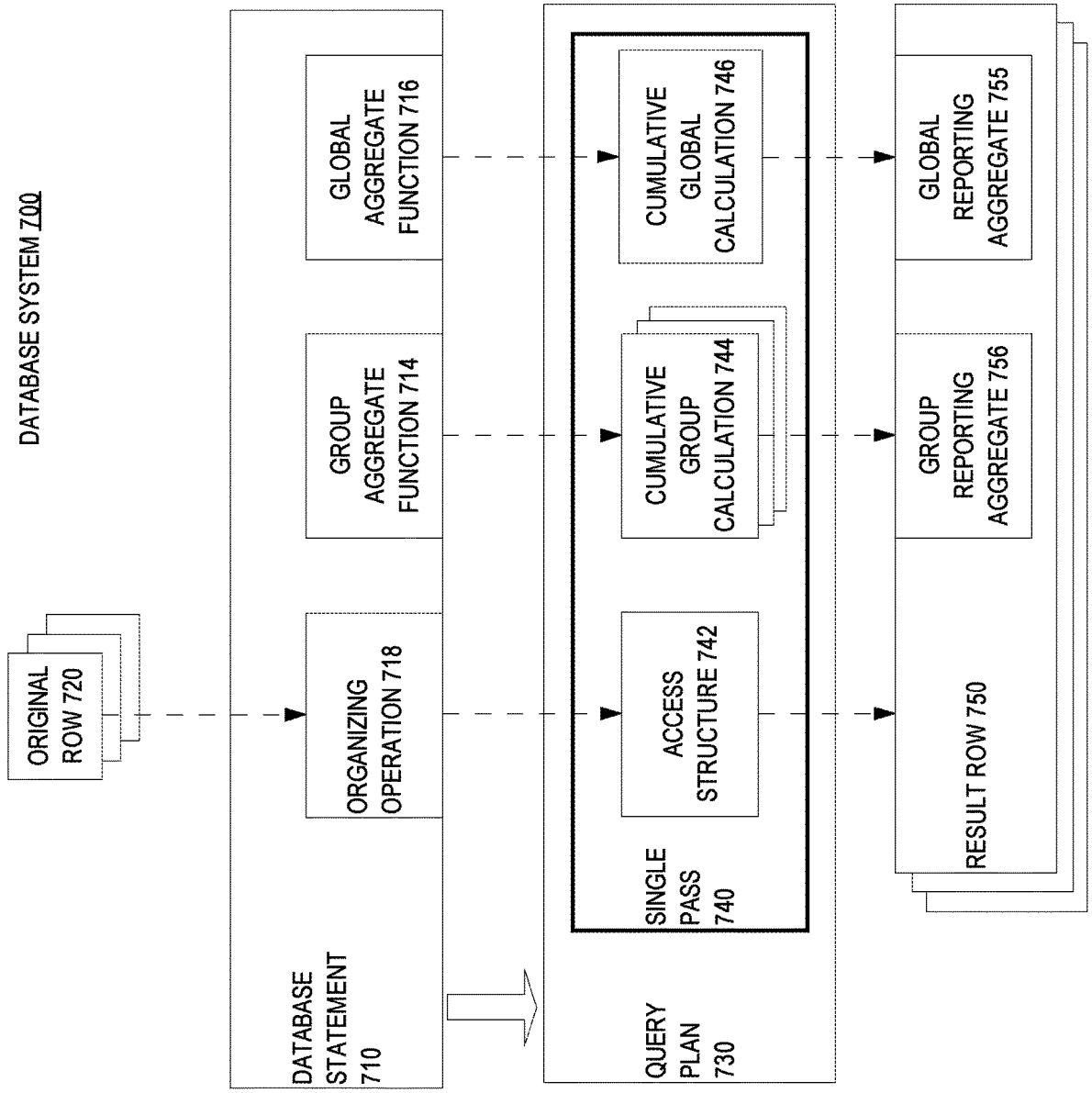
FIG. 7 is a block diagram that depicts an example database system, in an embodiment.

FIG. 7 is a block diagram that depicts an example database system 700, in an embodiment. Database system 700 fuses a global reporting aggregate computation with an organizing operation in a query tree for efficient evaluation. Database system 700 may be an implementation of database system 100. Database system 700 also includes database statement 710, original rows 720, query plan 730, and result rows 750.

In operation, database system 700 receives database statement 710. Database statement 710 has global aggregate function 716, organizing operation 718, and group aggregate function 714.

Database system 700 compiles and optimizes database statement 710 to generate query plan 730. Query plan 730 specifies that database system 700 should perform database statement 710 during a single pass 740.

Populating access structure 742 with data is not the only computation that occurs during single pass 740. Also during single pass 740, cumulative group calculation 744 and cumulative global calculation 746 are ongoing computations that are potentially updated each time organizing operation 718 visits another original row 720.

Updating either cumulative calculation 744 or 746 depends on the respective aggregate function 714 or 716. In the example of FIG. 7, the group aggregate function specifies arithmetic summation. In that example, records are grouped by color. There is a separate cumulative group calculation 744 for each color. The value of cumulative group calculation 744 is incremented according to the weight of each record having the same color.

In this example, the global aggregate function 716 specifies arithmetic summation. As such, whenever any cumulative group calculation 744 is incremented, then cumulative global calculation 746 is also incremented by the same amount. An optimization is to skip cumulative global calculation 746 for any original row 720 that did not cause cumulative group calculation 744 to change.

Both aggregate functions 714 and 716 are applied during single pass 740. Performance of single pass 740 finishes when all original rows 720 have been processed. After single pass 740, some processing is still pending. This includes copying the final value of cumulative global calculation 746, shown as global reporting aggregate 755, into at least one of result rows 750. This also includes copying the final value of each cumulative group calculation 744, shown as group reporting aggregate 756, into at least one of result rows 750. This includes final formatting of result rows 750 and their serialization to a consumer. In this example, there is one result row 750 per color.

12.0 Third Example Query Plan

Figure 8:
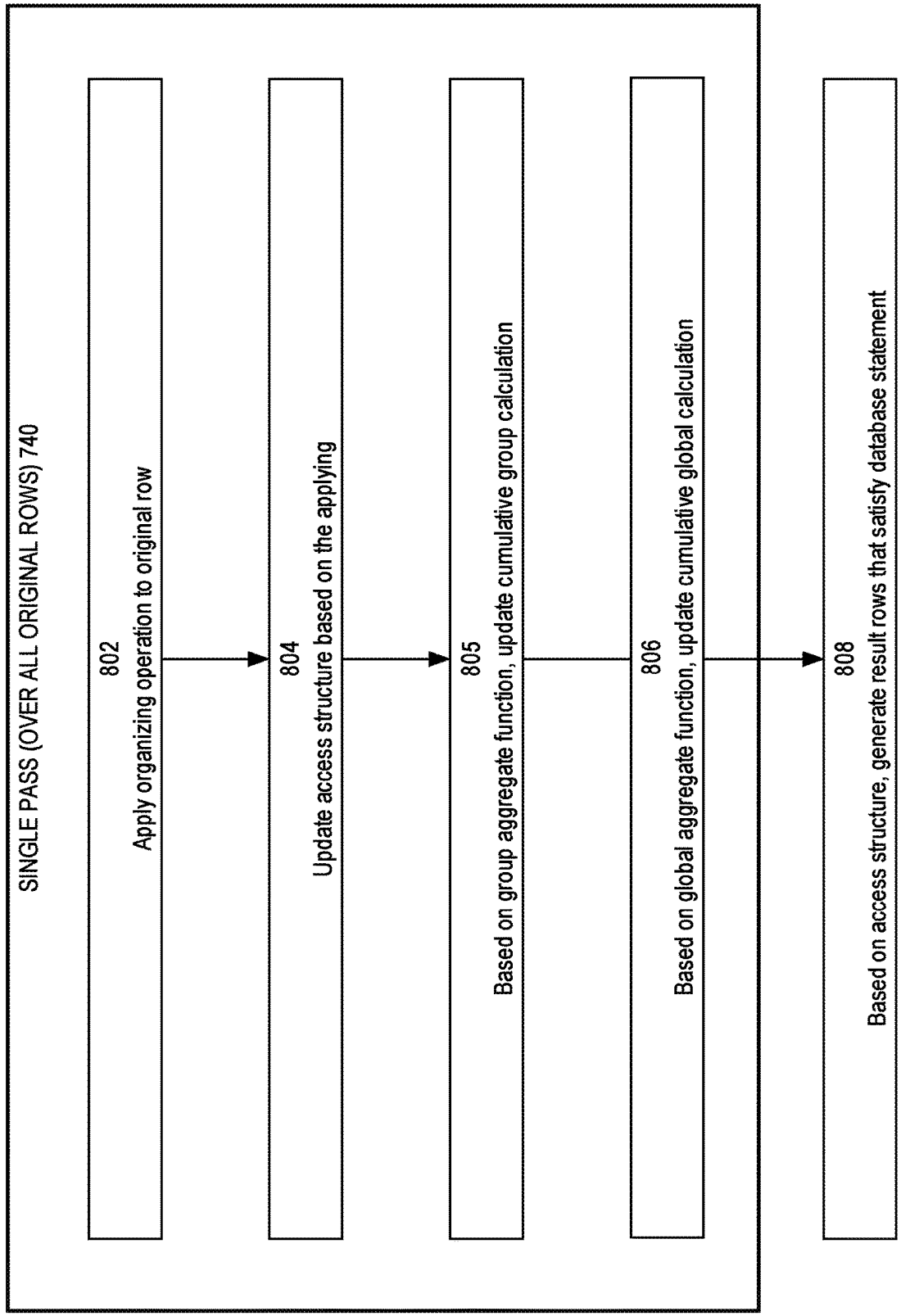
FIG. 8 is a flow diagram that depicts an example process that executes a query plan, in an embodiment.

FIG. 8 is a flow chart that depicts query plan 730 as an example query plan that calculates a global reporting aggregate in a single pass, in an embodiment. The steps of this process are discussed with respect to database system 700.

The heart of query plan 730 is single pass 740, which specifies all of the processing needed to calculate a global reporting aggregate and a group reporting aggregate for each group. After single pass 740, step 808 generates result rows, for which all values were calculated during single pass 740.

Single pass 740 has steps 802 and 804-806. Query plan 730 specifies that the steps of single pass 740 are to be repeated for each of original rows 720. During single pass 740, but before step 802, database system 700 constructs access structure 742, which is initially empty.

Step 802 applies an organizing operation to the current original row. For example, database system 700 applies organizing operation 718 to the current original row 720.

Step 804 populates the access structure. Depending on the implementation, steps 802 and 804 may be combined. For example, database system 700 determines a proper insertion location within access structure 742 for the current original row 720, based on organizing operation 718.

Step 805 updates a corresponding cumulative group calculation, such as a group subtotal. For example, database system 700 updates cumulative group calculation 744 based on group aggregate function 714 and the current original row 720. Depending on the type of group aggregate function 714, in some cases cumulative group calculation 744 will not be updated for every original row 720. For example, if group aggregate function 714 specifies a numeric maximum, then cumulative group calculation 744 will be updated only if a prior maximum is exceeded by the value of the current original row 720. Applying group aggregate function 714 may be accelerated if group aggregate function 714 depends on a column that is available in columnar format.

Step 806 updates a cumulative global calculation, such as a grand total. For example, database system 700 updates cumulative global calculation 746 based on global aggregate function 716 and the current original row 720.

Step 808 generates result rows. For example before this step begins, single pass 740 has finished, and all original rows 720 were processed. All of the values needed for result rows 750 were determined during single pass 740. Each result row 750 has values supplied by corresponding data within access structure 742. Database system 700 copies global reporting aggregate 755 into at least one result row 750. Database system 700 also copies each group reporting aggregate 756 into at least one result row 750. Step 805 also performs final formatting of result rows 750 and serializes them to a consumer.

13.0 Example Hash Table

Figure 9:
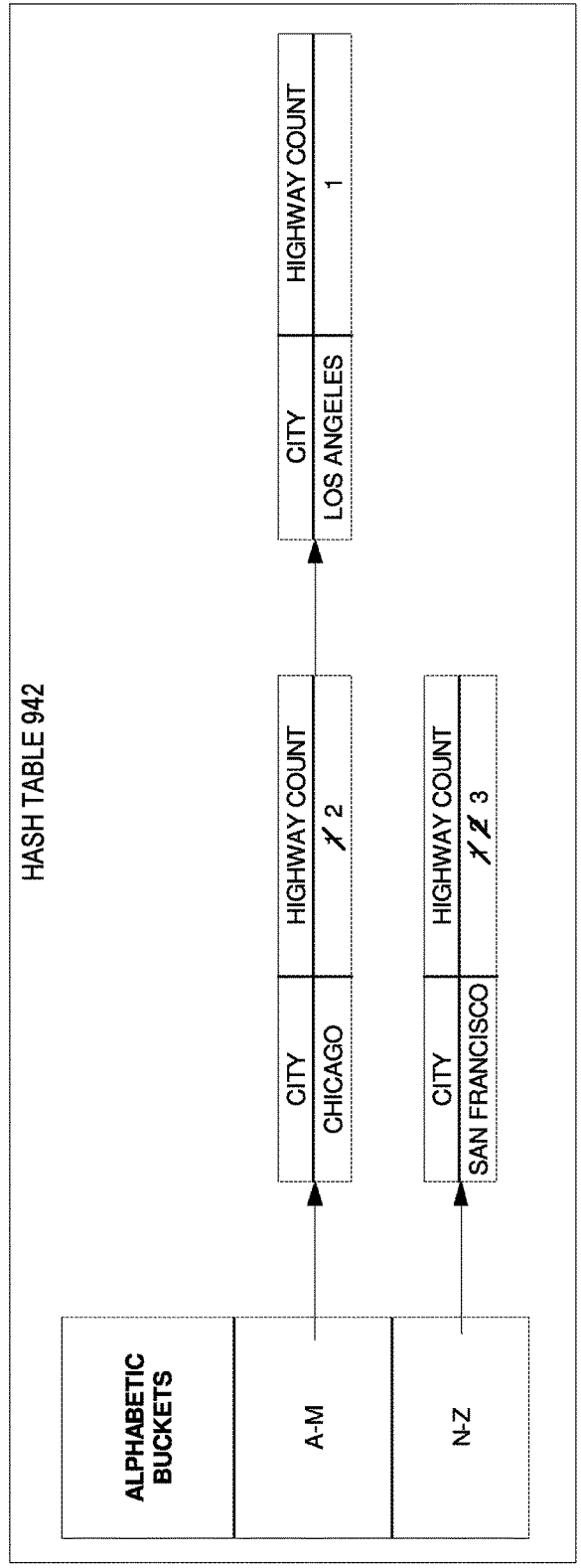
FIG. 9 is a block diagram that depicts an example database system, in an embodiment.

FIG. 9 is a block diagram that depicts an example database system 900, in an embodiment. Database system 900 may be an implementation of database system 100. Database system 900 has hash table 942 for an access structure and grand total 945 as a global reporting aggregate.

In this example, original rows 920 are highway records that have the length and city of a segment of a highway. A database statement requests grand total 945 of highway miles in all cities and a count of highways in each city:

```
SELECT city, highway_count,
       SUM(subtotal) OVER ( )
FROM (SELECT city,
       COUNT(*)      -- A group aggregate function
         AS highway_count
       SUM(miles)    -- Another group aggregate function
         AS subtotal
     FROM Highway
       GROUP BY city
)
```

Original rows 920 are processed in a single pass. During that pass, hash table 942 becomes populated with result rows. There is one result row per city.

Hash table 942 has alphabetic buckets A-M and N-Z, although other implementations may have more buckets, such as one per each letter in the alphabet. Which bucket an original row 920 hashes into depends on the first letter of its city.

For example, Chicago and Los Angeles both hash into the same bucket, in which case those two cities form a linked list that is attached to the A-M bucket. There is a result row for each city in the buckets. This organizing by city within the buckets is what implements the GROUP BY clause.

There are two group aggregate functions in this example, COUNT(*) and SUM(miles). Counting how many highways are in each city involves incrementing the highway count of a city within a bucket, for each original row 920.

Incrementing the highway count of a city is shown in FIG. 9 as a prior count scratched out with a slash, and a new count beside it. This occurs during the single pass, as well as incrementing grand total 945 of miles.

14.0 Example B-Tree

Figure 10:
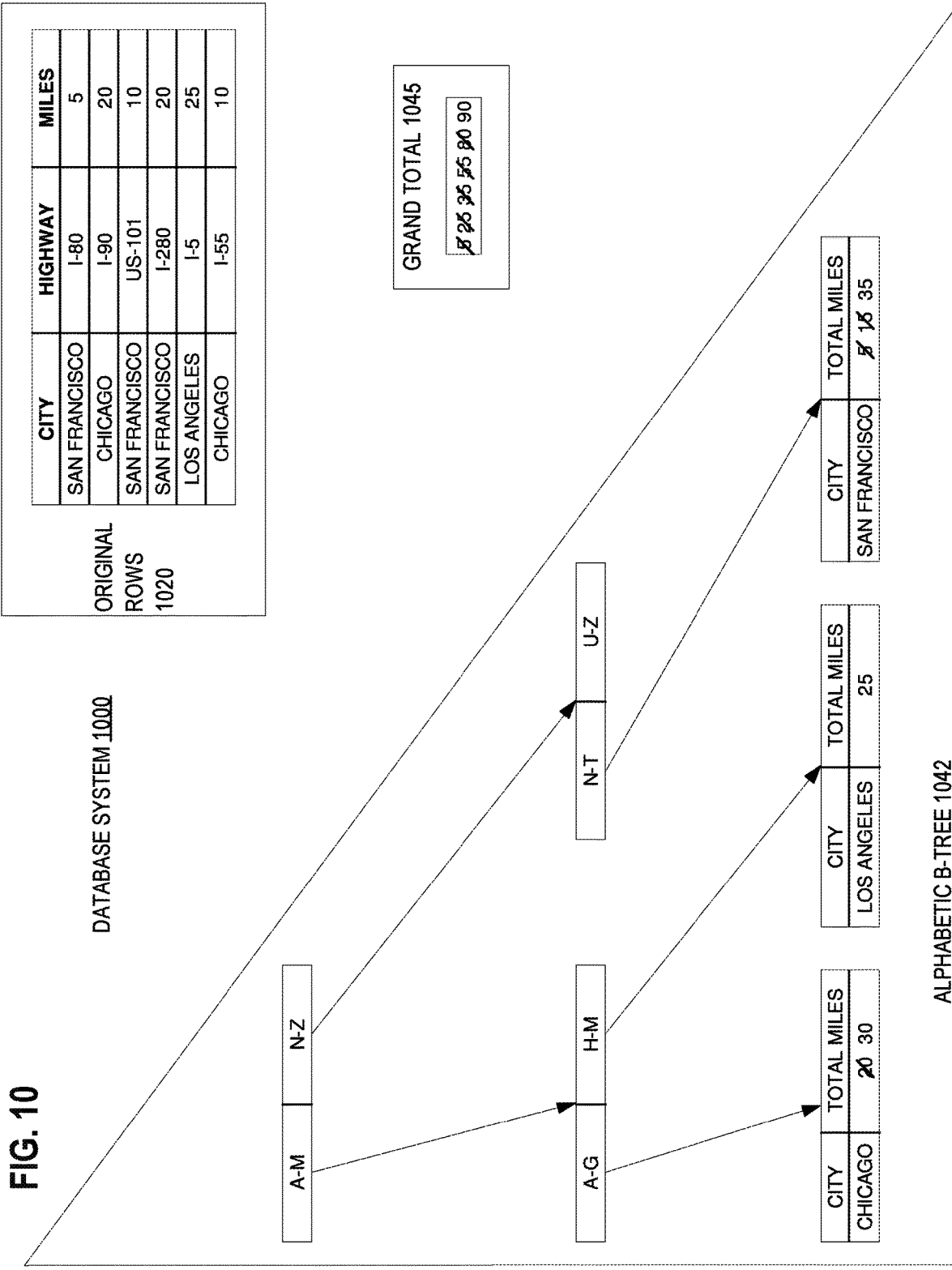
FIG. 10 is a block diagram that depicts an example database system, in an embodiment.

FIG. 10 is a block diagram that depicts an example database system 1000, in an embodiment. Database system 1000 may be an implementation of database system 100. Database system 1000 has alphabetic B-tree 1042 for an access structure and grand total 1045 as a global reporting aggregate.

In this example, original rows 1020 are highway records that have the length and city of a segment of a highway. A database statement requests grand total 1045 of highway miles in all cities and a subtotal of miles in each city:

```
SELECT city, subtotal,
       SUM(subtotal) OVER ( )
FROM (SELECT city,
       SUM(miles)
         AS subtotal
     FROM Highway
       GROUP BY city -- An organizing operation
       ORDER BY city -- Another organizing operation
)
```

Original rows 1020 are processed in a single pass. During that pass, B-tree 1042 becomes populated with result rows.

There are two organizing operations in this example, GROUP BY and ORDER BY. There is one result row per city.

B-tree 1042 has a hierarchy of alphabetic buckets, which are all but the leaf nodes of B-tree 1042. B-tree 1042 is self-balancing. B-tree 1042 properly sorts its cities, which implements the ORDER BY clause.

15.0 Example Parallelism

Figure 11:
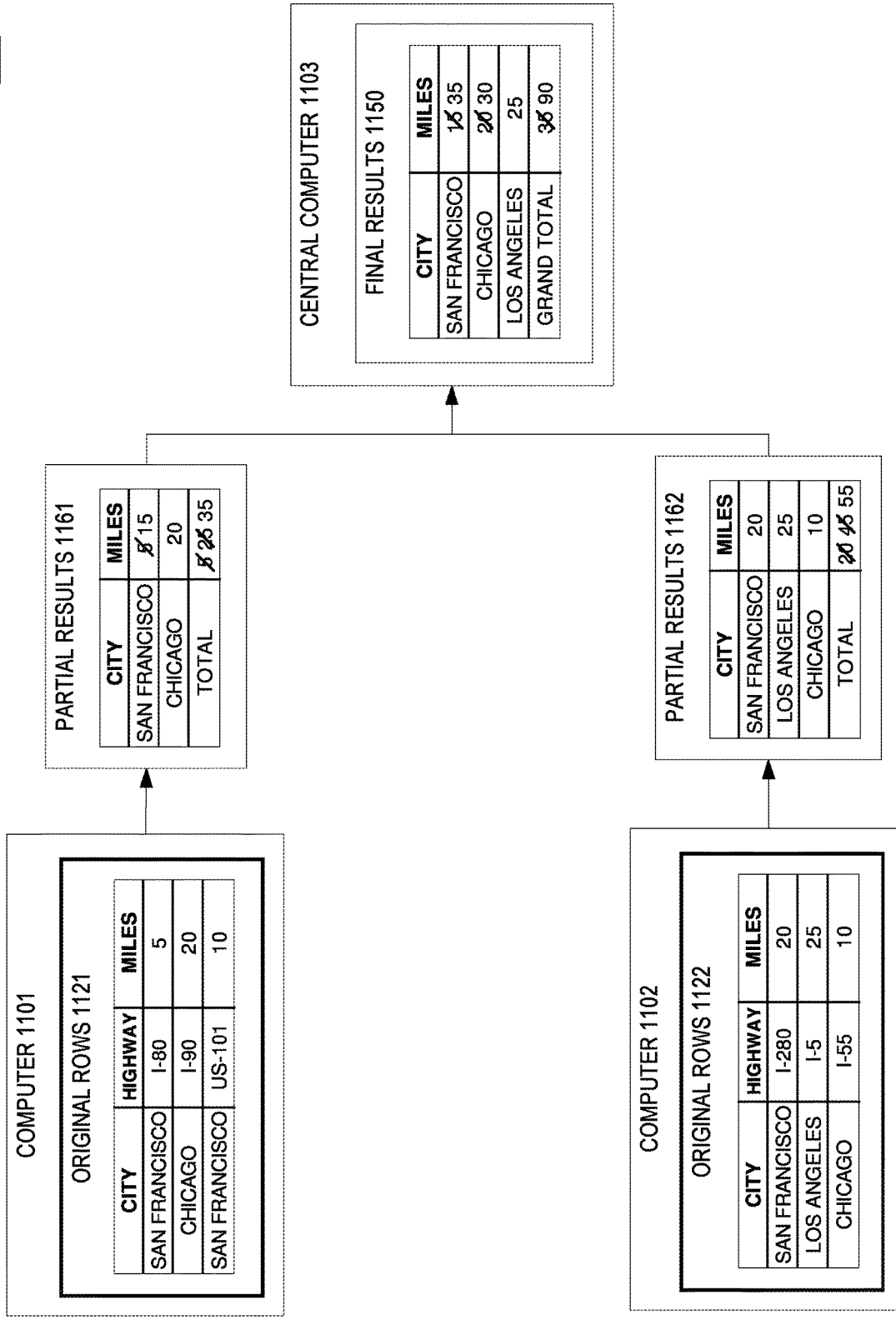
FIG. 11 is a block diagram that depicts an example computer cluster, in an embodiment.

FIG. 11 is a block diagram that depicts an example computer cluster 1100, in an embodiment. Computer cluster 1100 may be an implementation of database system 100.

Computer cluster 1100 uses distributed computing to accelerate its processing of a query in a single pass. The pass includes calculation of a grand total and subtotals by city.

Computer cluster 1100 has central computer 1103 and at least computers 1101-1102. During the single pass, each of computers 1101-1102 processes a subset of all original rows, which are original rows 1121-1122 respectively. Work stealing may be used if computer cluster 1100 partitions all original rows into more than one subset per computer.

Each of computers 1101-1102 generates partial results 1161-1162 respectively, which represent data that was populated into an access structure, such as a B-tree, on each computer. Each computer sends its partial results to central computer 1103. The single pass finishes when central computer 1103 has combined all partial results.

16.0 Example Optimizations

FIG. 12 is a table that depicts an example optimization chart 1200, in an embodiment. Some occurrences of a group aggregate function and a global aggregate function within a query may be optimized. Query optimization implies that a query may have alternate execution plans and that an optimized plan may execute faster than a naive plan. For example, multiple plans may be derived from a query that asks for a count of how many workers does each department of a company have (a group aggregate) and how many workers does the company have in total (a global aggregate). Furthermore, the query may explicitly ask for the company-wide total as a sum of department subtotals (head counts). However, that does not mean that an optimized query plan must calculate the company-wide total as a sum of subtotals. Optimization chart 1200 lists ways in which a group aggregate function and a global aggregate function can be optimized.

16.1 Replacement of Global Aggregate Function

Optimization chart 1200 lists ways in which a group aggregate function and a global aggregate function can be combined into a single aggregate function that accomplishes the same calculation. A database statement that specifies a group aggregate function and a given global aggregate function can be matched with a row of optimization chart 1200 to look up a corresponding optimized global aggregate function to be used in the query plan instead of the given global aggregate function.

For example, a database system may calculate a grand total by summing individual values to get group subtotals and then summing the subtotals to get the grand total. The database system may calculate the same grand total more efficiently if the grand total is incremented directly for each original row, rather than waiting to sum all of the subtotals.

Such an optimization is listed in the first row of optimization chart 1200 as example A. Example A shows that a grand total of subtotals, which is a global SUM of group COUNTS, can be optimized as the COUNT of all individual records. When query planning for the global aggregate function, instead of nesting the invocation of the group aggregate function within the global aggregate function, such as SUM(COUNT( )), that combination of group and global aggregate functions can be replaced by COUNT( ) of all original rows, which may be faster in some implementations.

Examples B-E show other optimizations for other pairings of group aggregation function and global aggregation function. For instance, example E shows that the minimum of all group minimums is the same as the minimum of all original rows.

16.2 Other Optimization with Idempotency

Examples A-E exploit an ability to perform a cumulative global calculation in a way that is independent from the cumulative group calculation, even though the original query may specify that the cumulative global calculation is based on the cumulative group calculation. Example F is different. It only partially optimizes because calculation of its global aggregate is inherently dependent on the group aggregate, unlike examples A-E. It does not have an optimized global aggregate function that can replace the given global aggregate function. However, example F satisfies two preconditions that enable some optimization. As long as both preconditions are satisfied, the global aggregate can be calculated on the fly, such that any update to the cumulative group calculation may potentially be accompanied by an immediate update to the cumulative global calculation.

For this reason, an update to a group SUM may trigger an immediate update to a global MAX of the group SUMs. For example, a query may ask for the expenses of each department (group) to be summed into department subtotals. The same query may also ask for the (global) maximum department subtotal of all department subtotals, perhaps to find out which department spent the most money. During query execution, whenever a department subtotal calculation is increased, the execution may use the new subtotal as a potential replacement of the current global maximum subtotal. Both of the subtotaling and the adjustment of the global maximum may be optimized to occur in a single pass over the expense records, because updating any group calculation may be accompanied by an immediate update to the global calculation.

The first precondition is that the group aggregate function is monotonic, which means that the group aggregate function never decreases or never increases the cumulative group calculation. For example, a cumulative SUM of non-negative numbers never decreases. Likewise, a cumulative SUM of non-positive numbers never increases. As such, SUM is monotonic so long as its input data does not contain both a positive number and a negative number.

The second precondition is that the given global aggregate function be idempotent, which means that the global aggregate function gives a correct result even when invoked with an input that does not actually affect the cumulative global aggregate. For example, a database table may contain a row per goal scored during one soccer game. A query may ask for how many goals did each of two opposing teams score as cumulative group sums and how many goals did the winning team score as a global maximum calculation (i.e. maximum goals scored by either of both teams). A first goal of the game may update both of a team (i.e. group) sum and a game (i.e. global) maximum. A second goal of the game, if not scored by the same team, would update the other team sum, but the game maximum score would be unchanged, because each of both teams has one goal and the game maximum had already been updated to one when the first goal was scored. Here, two goals were scored during the game, and the SUM and MAX function may be invoked for each goal. However, the global maximum is updated only once, from zero to one, despite the MAX function being invoked twice (once for each goal). The MAX function is idempotent in the sense that invoking it once for every row does not distort the cumulative calculation, even though only some of the invocations actually affect the cumulative calculation.

The idempotency precondition is why MAX(SUMO) enables this optimization, and SUM(MAX( )) does not. This is because both of MAX and SUM are monotonic, but only MAX is idempotent. For example, it would be erroneous to update a global sum of group maximums every time any group maximum is updated. For example, if a group of ten expense rows happens to already be sorted in ascending order, then the group maximum updates ten times. If the global sum were to be updated for each of those ten updates of the group maximum, then the global sum would be erroneously high.

16.3 Compensation without Idempotency

Example G achieves optimization similar to that of example F, but with two differences. First, example G does not satisfy the idempotency precondition, because the given global aggregate function, SUM, is not idempotent. Second, optimizing example G involves additional processing of the cumulative global calculation based on a cumulative group calculation.

Example G globally sums the maximum of each group. The cumulative group calculation (using the group aggregate function) for that group is needed to undo the effect of a prior cumulative group calculation upon the cumulative global calculation when the current value of the cumulative group calculation is updated.

For example, rows may represent balls that may be grouped by color. A query may request the heaviest ball of each color and the combined weight of those heaviest balls. During a single pass over the balls (rows), a first green ball may initially be designated as the heaviest green ball, and then later during the single pass, that designation may be reassigned to a heavier green ball.

In such a scenario, the cumulative group calculation for the green group may initially record the weight of the heaviest green ball as three pounds and then be changed to record a weight of five pounds when a heavier green ball is encountered during the single pass. As such, the cumulative global calculation is updated for the three-pound green ball and then again for the five-pound green ball.

However, the second of those updates should not simply add five pounds to the cumulative global calculation, even though the global aggregate function specifies summing. When processing the five-pound green ball, the prior value of the cumulative group calculation for the green group should be deducted from the cumulative global calculation. For example, three pounds should be subtracted from the cumulative global calculation.

Processing the five-pound green ball may then continue as described earlier. For example, the value of the cumulative group calculation for the green group may be updated to a value of five pounds, and five pounds may be added to the cumulative global calculation.

17.0 Discrepant Aggregate Functions

Figure 13:
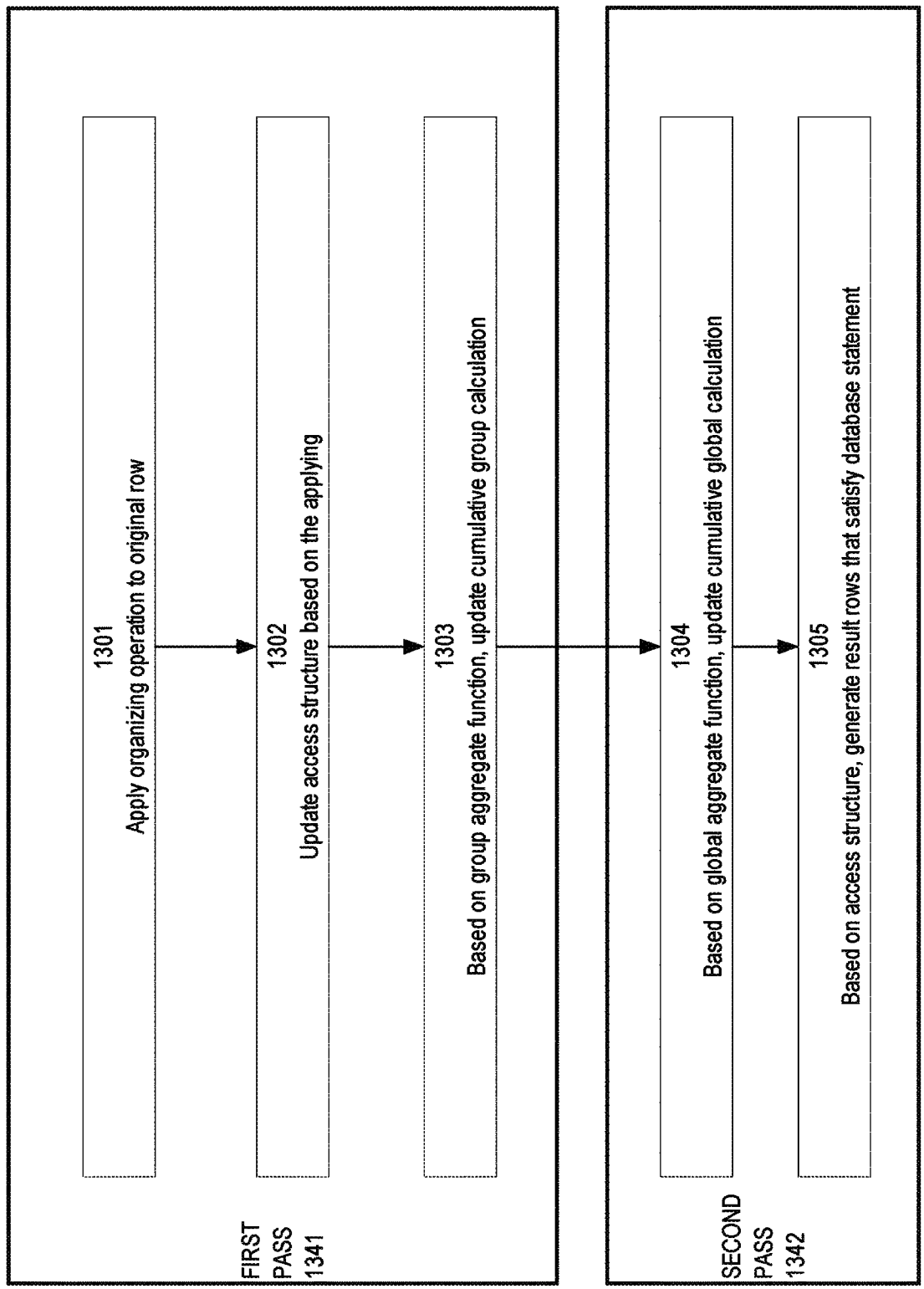
FIG. 13 is a flow diagram that depicts an example process that executes a query plan, in an embodiment.

FIG. 13 is a block diagram that depicts an example query plan that updates its cumulative global calculation during a second pass, in an embodiment. Some pairings of a group aggregate function and a global aggregate function cannot be optimized as shown in FIG. 12.

In such a case, a single pass may be insufficient to calculate both the cumulative group calculation and the cumulative global calculation. Instead, query plan 1330 may specify that updating the access structure and updating the cumulative group calculation are performed during first pass 1341. Whereas, updating the cumulative global calculation may be performed during second pass 1342. Except for this algorithmic variation, the processing is the same as in the above embodiments.

Step 1301 applies an organizing operation of a database statement. For example if the access structure is a hash table, the database system may calculate a hash code of each original row. This may implement a GROUP BY organizing operation.

Step 1302 updates the access structure. For example, as original rows are iterated, the access structure can be updated based on data from each row that is visited. This may involve inserting data into a hash table or B-tree.

During first pass 1341, each group in the access structure has a corresponding cumulative group calculation. Step 1303 updates one of the cumulative group calculations based on a group aggregate function.

During second pass 1342, step 1304 updates the cumulative global calculation base on a global aggregate function. Unlike traditional techniques, this avoids copying data for all rows from the organization operation as input to the cumulative global calculation. Such copying involves additional CPU instructions and might spill to disk.

Based on the content of the access structure, step 1305 generates result rows that satisfy the database statement. The final results of the cumulative global calculation and all of the cumulative group calculations are included in the results rows.

18.0 Costing

Figure 14:
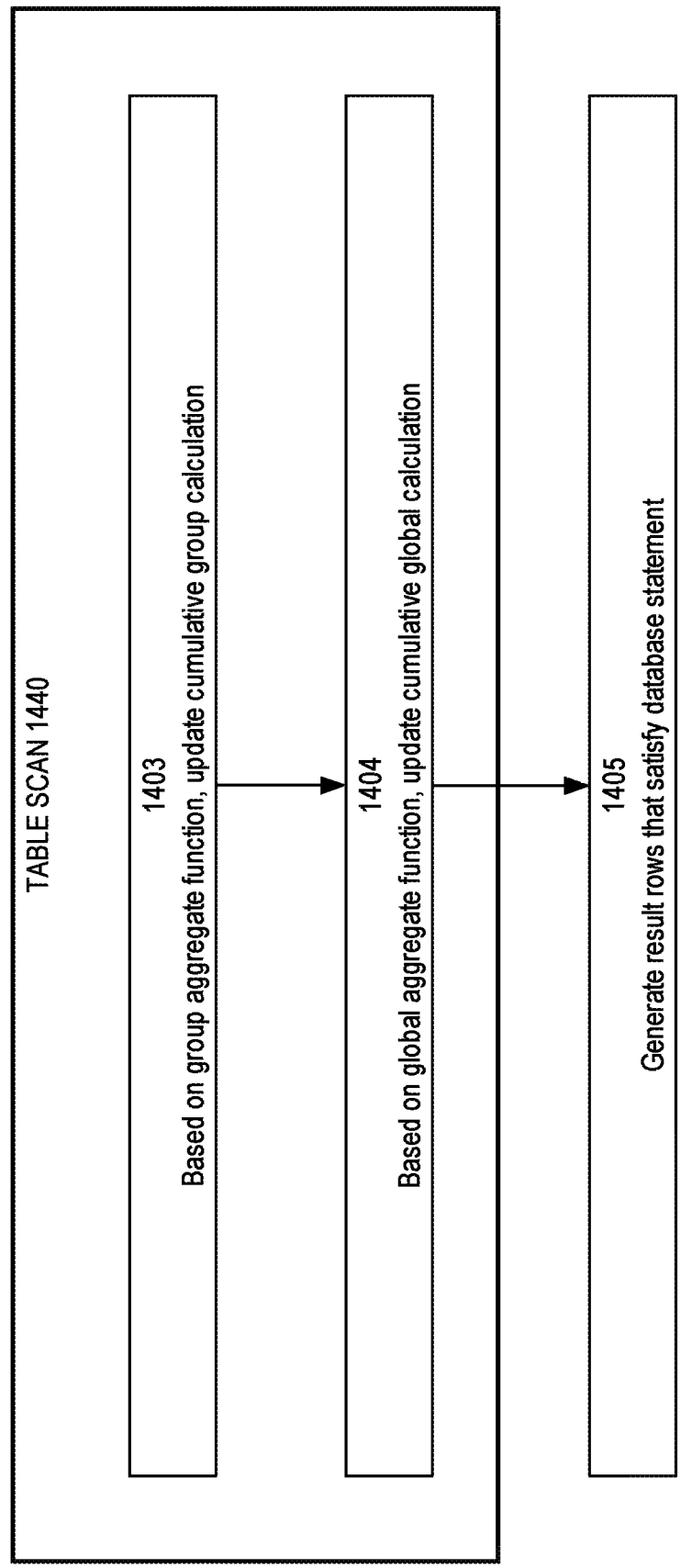
FIG. 14 is a flow diagram that depicts an example process that executes a query plan, in an embodiment.

FIG. 14 is a block diagram that depicts an example query plan that updates its cumulative global calculation during a table scan, in an embodiment. A database system may using cost estimation of data access to determine how to optimize, for example when all of the rows of a table are cached within volatile or non-volatile memory.

A database system may use a mathematical formula for a cost-based decision of whether or not to use two passes when calculating a global reporting aggregate for a table that resides in memory. The formula may have parameters for the size of the table, measured in rows or data blocks, and the relative speeds of the various storage media such as mechanical disk, flash, or volatile memory.

Table scan 1440 of a table that is cached in memory may be much faster than scanning the same table on disk. In such a case, the database system may decide that updating a cumulative global calculation during table scan 1440 may be faster than updating the calculation after table scan 1440. For example, query plan 1430 may specify a first pass that performs table scan 1440 in memory. Steps 1401-1404 happen during table scan 1440.

This optimization may also be cost effective even without caching, such as when disk reading is asynchronous. For example, latency of fetching another data block may be pipelined to occur while the prior data block is being computationally processed.

Cost estimation may recognize that asynchronous reading reduces the cost of disk latency during table scanning. However, such cost estimation may also recognize that filtration, such as by a WHERE clause, may actually suppress most rows and so might not benefit from optimization based on asynchronous reading.

In an embodiment, there is no access structure and no organizing operation for this table scan.

Each group has a corresponding cumulative group calculation. Step 1403 updates one of the cumulative group calculations based on a group aggregate function.

During the table scan, step 1404 updates the cumulative global calculation base on a global aggregate function.

After the table scan, step 1405 generates result rows that satisfy the database statement. The final results of the cumulative global calculation and all of the cumulative group calculations are included in the results rows.

19.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
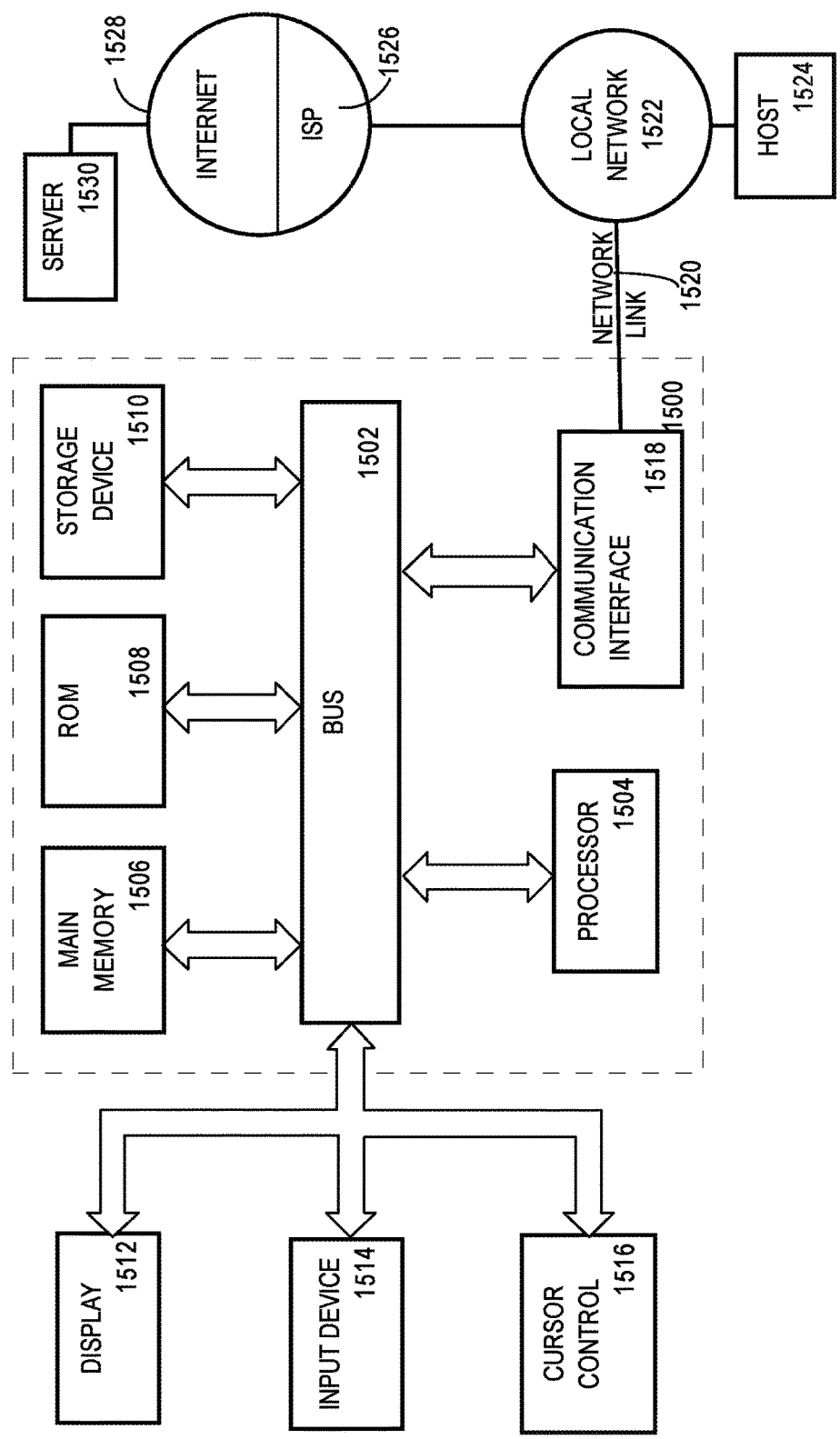
FIG. 15 is a block diagram that illustrates a computer system upon which an embodiment of the invention may be implemented.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
 detecting a global aggregate function and a group aggregate function that are required for a database statement issued against a plurality of rows;

generating, based on said detecting, an execution plan for said database statement, wherein said execution plan specifies in a single pass, for each row of said plurality of rows, performing:
- based on said row, modifying or adding a particular row that is stored in an access structure,
- based on said global aggregate function, updating a cumulative global calculation, and
- updating, based on said group aggregate function, a cumulative group calculation of a plurality of cumulative group calculations, wherein each cumulative group calculation of said plurality of cumulative group calculations is associated with a respective portion of said access structure;

generating one or more result rows that satisfy said database statement, wherein said one or more result rows contains:
- a final result of said cumulative global calculation, and
- a final result for at least one cumulative group calculation of the plurality of cumulative group calculations.

2. The method of claim 1 wherein said execution plan further specifies in said single pass:
- based on a first row of said plurality of rows, adding said particular row that is stored in said access structure, and
- based on a second row of said plurality of rows, modifying same said particular row that is stored in the access structure.

3. The method of claim 1 wherein values of a column occupy a column vector, wherein the method further comprises applying an organizing operation by reading a value from said column vector.

4. The method of claim 1 wherein:
- the method further comprises determining a replacement global aggregate function based on said group aggregate function and said global aggregate function;
- updating the cumulative global calculation based on said global aggregate function comprises updating a cumulative global calculation based on said replacement global aggregate function.

5. The method of claim 1 wherein:
- said single pass is a first pass;
- the method further comprises deciding to perform said first pass during a table scan, based on recognizing that said plurality of rows resides entirely within memory;
- said table scan in memory, said updating said cumulative group calculation, and said updating said cumulative global calculation are performed during the first pass;
- said modifying or adding the particular row is not performed;
- said generating the one or more result rows occurs during a second pass.

6. The method of claim 1 wherein said global aggregate function comprises at least one selected from the group consisting of: a sum, a maximum, a median, and a mode.

7. The method of claim 1 wherein:
- said detecting the global aggregate function comprises detecting an organizing operation that is specified in said database statement;
- in a single pass, for each row of said plurality of rows, performing further comprises applying said organizing operation to said row;
- said modifying or adding the particular row is based on said applying said organizing operation; and
- said generating the one or more result rows is based on said access structure.

8. The method of claim 7 wherein said organizing operation comprises at least one selected from the group consisting of: aggregating groups of rows and joining rows.

9. The method of claim 7 wherein said access structure comprises at least one selected from the group consisting of: a hash table and a B-tree.

10. The method of claim 7 wherein:
- said single pass is specified to be performed in parallel by distributing, to each computer of a plurality of computers, a respective portion of said plurality of rows, wherein each computer of the plurality of computers contains a respective access structure and a respective cumulative calculation;
- applying said organizing operation to said row comprises each computer of the plurality of computers applying said organizing operation to each row of said respective portion;
- said modifying or adding the particular row comprises each computer of the plurality of computers updating said respective access structure;
- updating a cumulative calculation comprises each computer of the plurality of computers updating said respective cumulative calculation;
- said generating the one or more result rows based on said access structure comprises:
  - receiving, from each computer of the plurality of computers, respective partial results based on said respective access structure and said respective cumulative calculation,
  - generating the one or more result rows based on said respective partial results of each computer of the plurality of computers.

11. The method of claim 1 wherein values of a column occupy a column vector, wherein said updating the cumulative group calculation comprises reading a value from said column vector.

12. A method comprising:
- detecting a global aggregate function and a group aggregate function that are specified in a database statement issued against a plurality of rows;
- deciding, based on recognizing that said group aggregate function and said global aggregate function cannot be combined into one aggregate function, to generate an execution plan that has two passes;
- generating for said database statement, based on said detecting, an execution plan that specifies:
  - in a first pass, for each row of said plurality of rows, performing:
    - updating an access structure based on said row; and
    - updating, based on said group aggregate function, a cumulative group calculation of a plurality of cumulative group calculations, wherein each cumulative group calculation of said plurality of cumulative group calculations is associated with a respective portion of said access structure;
  - in a second pass updating, based on said global aggregate function, a cumulative global calculation;
- generating one or more result rows that satisfy said database statement, wherein at least one of said one or more result rows contains a final result of said cumulative global calculation, wherein a final result of each cumulative group calculation of said plurality of cumulative group calculations is contained in at least one of said one or more result rows.

13. One or more non-transitory computer readable media comprising instructions that, when executed by one or more processors, cause:

detecting a global aggregate function and a group aggregate function that are specified in a database statement issued against a plurality of rows;

deciding, based on recognizing that said group aggregate function and said global aggregate function cannot be combined into one aggregate function, to generate an execution plan that has two passes;

generating for said database statement, based on said detecting, an execution plan that specifies:
  in a first pass, for each row of said plurality of rows, performing:
    updating an access structure based on said row; and
    updating, based on said group aggregate function, a cumulative group calculation of a plurality of cumulative group calculations, wherein each cumulative group calculation of said plurality of cumulative group calculations is associated with a respective portion of said access structure;
  in a second pass updating, based on said global aggregate function, a cumulative global calculation;

generating one or more result rows that satisfy said database statement, wherein at least one of said one or more result rows contains a final result of said cumulative global calculation, wherein a final result of each cumulative group calculation of said plurality of cumulative group calculations is contained in at least one of said one or more result rows.

14. One or more non-transitory computer readable media storing instructions that, when executed by one or more processors, cause:

detecting a global aggregate function and a group aggregate function that are required for a database statement issued against a plurality of rows;

generating, based on said detecting, an execution plan for said database statement, wherein said execution plan specifies in a single pass, for each row of said plurality of rows, performing:
  based on said row, modifying or adding a particular row that is stored in an access structure,
  based on said global aggregate function, updating a cumulative global calculation, and
  updating, based on said group aggregate function, a cumulative group calculation of a plurality of cumulative group calculations, wherein each cumulative group calculation of said plurality of cumulative group calculations is associated with a respective portion of said access structure;

generating one or more result rows that satisfy said database statement, wherein said one or more result rows contains:
  a final result of said cumulative global calculation, and
  a final result for at least one cumulative group calculation of the plurality of cumulative group calculations.

15. The one or more non-transitory computer readable media of claim 14 wherein values of a column occupy a column vector, wherein the instructions further cause applying an organizing operation by reading a value from said column vector.

16. The one or more non-transitory computer readable media of claim 15 wherein said organizing operation comprises at least one selected from the group consisting of: aggregating groups of rows and joining rows.

17. The one or more non-transitory computer readable media of claim 15 wherein:

said single pass is specified to be performed in parallel by distributing, to each computer of a plurality of computers, a respective portion of said plurality of rows, wherein each computer of the plurality of computers contains a respective access structure and a respective cumulative calculation;

applying said organizing operation to said row comprises each computer of the plurality of computers applying said organizing operation to each row of said respective portion;

said modifying or adding the particular row comprises each computer of the plurality of computers updating said respective access structure;

updating a cumulative calculation comprises each computer of the plurality of computers updating said respective cumulative calculation;

said generating the one or more result rows based on said access structure comprises:
  receiving, from each computer of the plurality of computers, respective partial results based on said respective access structure and said respective cumulative calculation,
  generating the one or more result rows based on said respective partial results of each computer of the plurality of computers.

18. The one or more non-transitory computer readable media claim 14 wherein:

said instructions, when executed by said one or more processors, further cause determining a replacement global aggregate function based on said group aggregate function and said global aggregate function;

updating the cumulative global calculation based on said global aggregate function comprises updating a cumulative global calculation based on said replacement global aggregate function.

19. The one or more non-transitory computer readable media of claim 14 wherein:

said instructions, when executed by said one or more processors, further cause deciding to perform said single pass in two passes, based on recognizing that said group aggregate function and said global aggregate function cannot be combined into one aggregate function;

said modifying or adding the particular row and said updating the cumulative group calculation are performed during a first pass;

said updating a cumulative global calculation is performed during a second pass.

20. The one or more non-transitory computer readable media of claim 18 wherein:

said single pass is specified to be performed in parallel by distributing, to each computer of a plurality of computers, a respective portion of said plurality of rows, wherein each computer of the plurality of computers contains a respective access structure and a respective cumulative calculation;

said applying said organizing operation comprises each computer of the plurality of computers applying said organizing operation to each row of said respective portion;

said modifying or adding the particular row comprises each computer of the plurality of computers updating said respective access structure;

updating a cumulative calculation comprises each computer of the plurality of computers updating said respective cumulative calculation;

said generating the one or more result rows based on said access structure comprises:

receiving, from each computer of the plurality of computers, respective partial results based on said respective access structure, generating the one or more result rows based on said respective partial results of each computer of the plurality of computers.

21. The one or more non-transitory computer readable media of claim 14 wherein said global aggregate function comprises at least one selected from the group consisting of: a sum, a maximum, a median, and a mode.

22. A method comprising:

detecting a global aggregate function and an organizing operation that are required for a database statement issued against a plurality of rows;

generating, based on said detecting, an execution plan for said database statement, wherein each computer of a plurality of computers contains a respective access structure and a respective cumulative calculation, wherein said execution plan specifies in a single pass:

distributing, to each computer of the plurality of computers, a respective portion of said plurality of rows, and in parallel each computer of the plurality of computers performing:

applying said organizing operation to each row of said respective portion, updating the respective access structure by, based on said applying said organizing operation, modifying or adding a particular row that is stored in the respective access structure, and based on said global aggregate function, updating the respective cumulative calculation;

receiving, from each computer of the plurality of computers, respective partial results based on said respective access structure and said respective cumulative calculation, generating, based on said respective partial results of each computer of the plurality of computers, one or more result rows that satisfy said database statement.

23. One or more non-transitory computer readable media storing instructions that, when executed by one or more processors, cause:

detecting a global aggregate function and an organizing operation that are required for a database statement issued against a plurality of rows;

generating, based on said detecting, an execution plan for said database statement, wherein each computer of a plurality of computers contains a respective access structure and a respective cumulative calculation, wherein said execution plan specifies in a single pass:

distributing, to each computer of the plurality of computers, a respective portion of said plurality of rows, and in parallel each computer of the plurality of computers performing:

applying said organizing operation to each row of said respective portion, updating the respective access structure by, based on said applying said organizing operation, modifying or adding a particular row that is stored in the respective access structure, and based on said global aggregate function, updating the respective cumulative calculation;

receiving, from each computer of the plurality of computers, respective partial results based on said respective access structure and said respective cumulative calculation, generating, based on said respective partial results of each computer of the plurality of computers, one or more result rows that satisfy said database statement.

* * * * *